United States Patent [19]
Tanaka et al.

[11] Patent Number: 4,881,857
[45] Date of Patent: Nov. 21, 1989

[54] MACHINE FOR CHAMFERING THE CORNER OF AN OBJECT TO BE PROCESSED

[75] Inventors: Yutaka Tanaka; Kenji Fukuda, both of Tokyo, Japan

[73] Assignee: Nitto Kohki Co., Ltd., Tokyo, Japan

[21] Appl. No.: 291,598

[22] Filed: Dec. 29, 1988

[30] Foreign Application Priority Data

Jan. 14, 1988 [JP] Japan ................................ 63-3639[U]

[51] Int. Cl.⁴ ............................ B23C 3/12; B27C 5/10
[52] U.S. Cl. ................................ 409/138; 144/134 D; 409/178; 409/182; 409/204; 409/214
[58] Field of Search ............... 409/137, 138, 139, 140, 409/175, 178, 181, 182, 204, 210, 214, 218; 144/134 D, 134 E, 136 C

[56] References Cited

U.S. PATENT DOCUMENTS 3,162,221 12/1964 Lacey .................................... 409/182
3,212,541 10/1965 Burrows et al. ................. 144/134 D
3,517,712 6/1970 Lelowitz ............................ 409/138
3,628,579 12/1971 Roche .................................. 409/178

FOREIGN PATENT DOCUMENTS 2719979 11/1978 Fed. Rep. of Germany ...... 409/178
62-100814 6/1987 Japan .

Primary Examiner—Daniel W. Howell
Attorney, Agent, or Firm—Nixon & Vanderhye

[57] ABSTRACT

A machine for chamfering the corner of an object comprising a rotating cutter arranged in a body, a slide guide pivoted slidably relative to the underside of the body and having guide planes perpendicular to each other and slidable along the corner of the object and also having a space which is formed between the guide planes and into which at least a part of cutting blades of the rotating cutter is projected, a stopper screw for connecting the slide guide and the body slidable to each other and serving to keep the cutting blades projected into the space by a predetermined distance, and a means for adjusting the cutting blades projected into the space.

8 Claims, 3 Drawing Sheets

MACHINE FOR CHAMFERING THE CORNER OF AN OBJECT TO BE PROCESSED

BACKGROUND OF THE INVENTION

1. Field of the Invention

The present invention relates to an improvement of the system for adjusting the chamfering amount of an object in the portable chamfering machine.

2. Description of the Related Art

In the case of the conventional chamfering machine intended to chamfer the corner of an object by a rotating cutter which has cutting blades round the outer circumference, the body of the machine having the rotating cutter at the front end thereof is provided with a slide guide which has guide plans perpendicular to each other and slidable along the corner of the object, and the cutting blades of the rotating cutter are tilted and projected into a space formed between the guide planes.

The amount of an object chamfered by this chamfering machine is determined by to what extent the cutting blades are projected into the space between the guide planes. As disclosed in the preliminary opened Japanese Utility Model Application No., Sho 62-100814, for example, the system for adjusting the cutting blades projected into the space comprises a boss arranged on the body of the chamfering machine and eccentric to the axial center of the rotating cutter, and the slide guide fitted into the eccentric boss at the base end thereof, wherein the chamfered amount of an object is set by the angle of the slide guide swung relative to the eccentric boss.

In the case of this adjusting system, however, the machine becomes complicated in construction because the eccentric boss must be arranged between the slide guide and the body of the machine. In addition, comparatively high processing accuracy is needed to make the eccentric boss because any error in processing the eccentric boss influences directly the relation between the angle of the slide guide swung relative to the eccentric boss and the chamfered amount of an object.

In order to solve this problem, the pending Japanese Application (Japanese Utility Model Application No. Sho 62-171167 filed by the assigned of the present invention on Nov. 11, 1987) has proposed a system enabling the chamfered amount of an object to be adjusted in such a way that the slide guide is swingably pivotd directly on the underside of the body from which the rotating cutter is projected, tilting relative to the underside, and that the cutting blades are projected into the space between the guide planes in proportion to the angle of the slide guide swung round its pivoted point.

Further studying the proposal made by Japanese Utility Model Application No. Sho 62-172167, the inventor of the present invention has found that the micro-adjusting of the chamfered amount of an object and slight changing of the chamfered amount of an object once set cannot be achieved simply and accurately, because the chamfered amount of an object must be adjusted by turning the hand of an operator, which supports the slide guide directly, relative to the body of the machine according to the proposed system wherein the cutting blades projected into the space between the guide planes of the slide guide are adjusted by swinging the slide guide pivoted on the underside of the body from which the rotating cutter is projected and wherein a means for keeping the adjusted projection of the cutting blades certain comprises a slot formed in the body and a stopper inserted into the slot and screwed into the slide guide at the front end thereof.

SUMMARY OF THE INVENTION

The present invention is intended to eliminate the above-mentioned drawbacks and the object of the present invention is therefore to provide a chamfering machine simple in construction and capable of adjusting the chamfered amount of an object easily and delicately.

The object of the present invention can be achieved by a machine for chamfering the corner of an object comprising a body having an underside; a rotating cutter arranged in the body and having cutting blades around the outer circumference of a portion of the rotating cutter which is projected from and slanted relative to the underside; a slide guide pivoted rotatable in relation to the underside and having guide planes perpendicular to each other and slidable along the corner of the object and also having a space formed between the planes and into which at least a part of the cutting blades of the rotating cutter is projected; one of the slide guide and the body having a slot; a stopper screw screwed into the other of the slide guide and the body at one end thereof and guided in slot at a portion thereof and serving to fix the slide guide and the body to each other to project the cutting blades into the space by a predetermined distance; and a means for moving that portion of the stopper screw, which is guided in slot, to adjust the cutting blades projected into the space.

When the stopper screw is loosened, the slide guide pivoted on the underside of the body becomes swingable round its pivoted point and the cutting blades of the rotating cutter are projected into the space between guide planes of the slide guide only by a distance which is proportional to the angle of the slide guide swung relative to the underside of the body. The chamfered amount of an object can be thus set. In a case where the adjusting means has an adjusting screw, the distance of the adjusting screw which is projected into the slot from one end of the slot can be made long or short by turning the adjusting screw in a desired direction and predetermined times. When the distance of the adjusting screw projected into the slot is adjusted like this, the micro-adjusting of the chamfered amount of an object can be achieved in proportion to the angle of the slide guide swung relative to the underside of the body, keeping the front end of the adjusting screw struck against the stopper screw. The chamfered amount of the object thus micro-adjusted can be kept by fixing the slide guide to the underside of the machine body by means of the stopper screw.

Therefore, the present invention makes it unnecessary to arrange a specific member such as the eccentric boss between the machine body and the slide guide. The system for adjusting the chamfered amount of an object can be thus made simple in construction and the number of parts used can be reduced.

When the adjusting screw which serves to move the stopper screw in the slot and prevent it from moving in a direction reverse to the direction in which it is moved by the adjusting screw is turned predetermined times in a desired direction, the chamfered amount of an object can be achieved in proportion to the distance of the adjusting screw moved in accordance with the pitch of its threads and the number of its turns. This makes is unnecessary that the hand of operator which supports directly the slide guide is turned relative to the machine body to adjust the chamfered amount of an object. The micro-adjusting of the chamfered amount of an object and slight changing of the chamfered amount of an object once set can be thus achieved easily and accurately. In other words, the chamfered amount of an object can be achieved easily, quickly and accurately.

The relation between the angle of the slide guide swung and the chamfered amount of an object depends only upon the position of pivot where the slide guide is pivoted on the underside of the machine body. Any error is hardly caused in the process of positioning this pivot point on the flat surfaces and the manufacture of the chamfering machine provided with this adjusting system can be made easier as compared with the case of using the eccentric boss. Further, the angle of the slide guide swung and the chamfered amount of an object have a proportional relation. Therefore, graduations for representing the chamfered amounts of objects can be easily formed at a same interval.

DETAILED DESCRIPTION OF THE PREFERRED EMBODIMENTS

Figure 1:
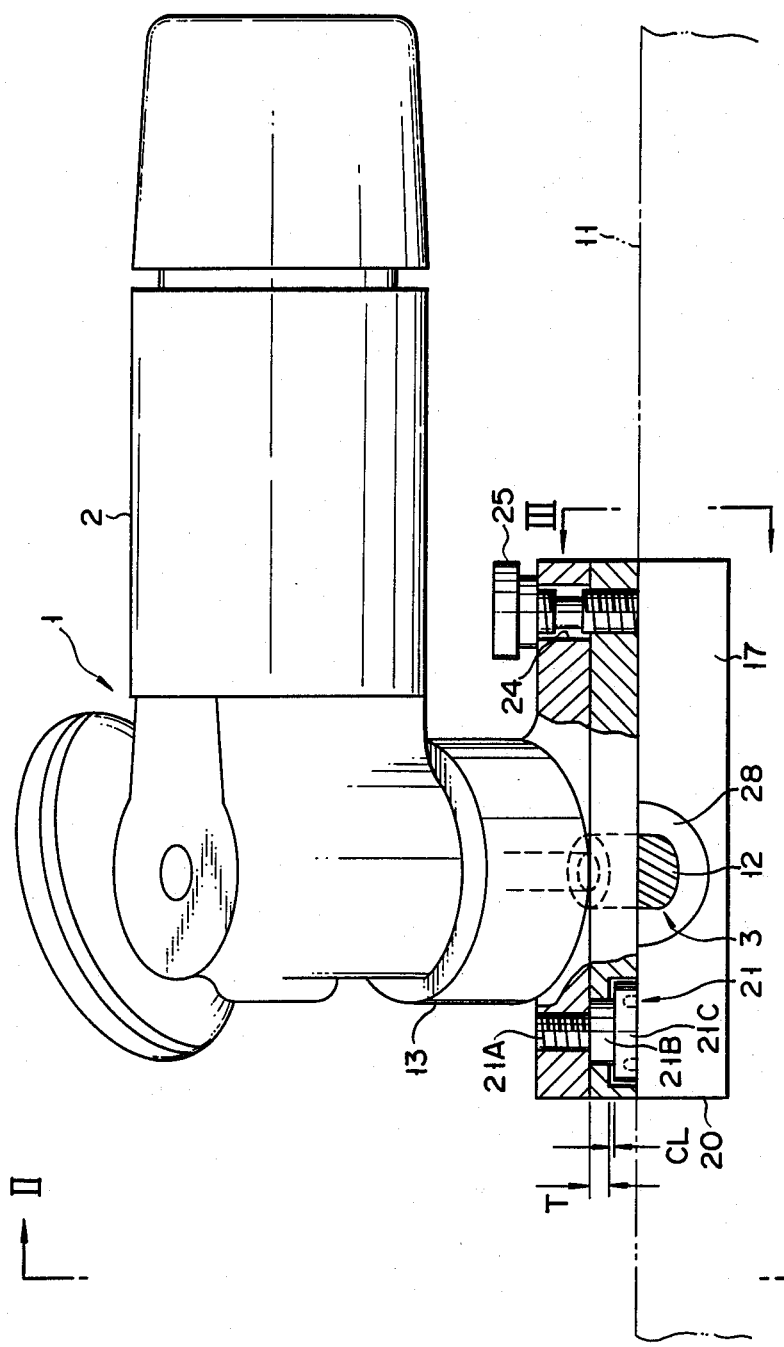
FIG. 1 is a front view showing an example of the chamfering machine according to the present invention.
Figure 2:
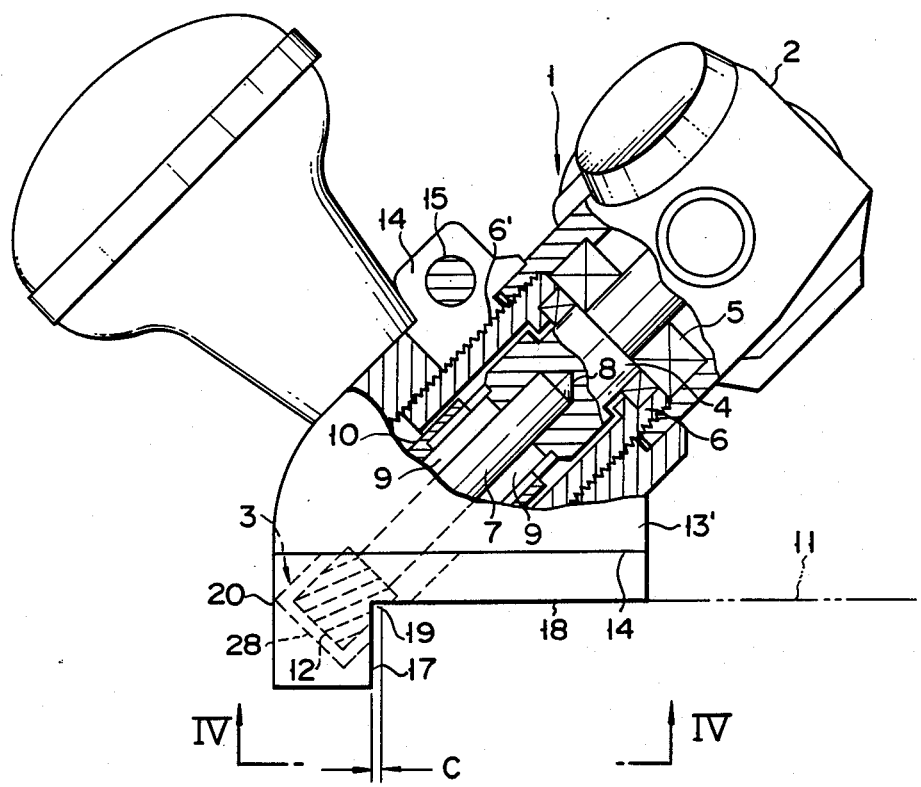
FIG. 2 is a side view showing the chamfering machine partly cut away and viewed from a line II—II in FIG. 1 in a direction shown by arrows.

In FIG. 1, reference numeral 2 represents a handle section in which a driving source such as the electric or air motor and a speed change gear system are housed. Spindle housing 6 provided with spindle 4 for supporting rotating cutter 3 and bearing means for spindle 4 is connected integral to handle section 3 in a generally L-shape. As shown in FIG. 2, rotating cutter 3 is attached to shaft 7 and center hole 8 into which shaft 7 is fitted is formed in the front end portion of spindle 4. Center hole 8 is communicated with plural split grooves 9 formed in the radial direction of center hole 8 to make the front end of spindle 4 flexible. Chuck ring 10 like the cap nut is screwed onto spindle 4 to hold and fix the front end portion of spindle 4 integral to shaft 7.

It is well known that rotating cutter 3 is provided on its outer circumference with a plurality of cutting blades for chamfering the corner of object 11 to be processed.

Male thread 6' having a small pitch is formed on the outer circumference of spindle housing 6. The boss section of guide base 13 is screwed onto male thread 6' and bolt 15 which is passed through split block 14 on the boss section of guide base 13 is fastened by a nut, so that guide base 13 can be connected integral to spindle housing 6 to form chamfering machine body 1 together with handle section 2. The chamfering machine pf the present invention is set to have a chamfering angle of 45°. When the boss section of guide base 13 is therefore screwed onto spindle housing 6, it is slanted relative to underside 13' of guide base 13 at 45°, and cutting blades 12 of rotating cutter 3 are projected from underside 13' of guide base 13 with the boss section slanted relative to underside 13' at 45°.

When bolt 15 is loosened and spindle housing 6 is turned together with handle section 2 relative to guide base 13, rotating cutter 3 is moved in the axial direction, depending upon the relation between the number of turnes of spindle housing 6 or handle section 2 and the pitch of thread 6', so that the amount of projection of rotating cutter 3 which is projected from underside 13' of guide base 13 can be adjusted. When the extent to which spindle housing 6 is screwed into the boss section of guide base 13 is changed, therefore, cutting blades 12 can be contacted with the corner of object 11 at all of their blade portions in the axial direction of rotating cutter 3.

Slide guide 20 is pivoted upon underslide 13' of guide base 13 to swing round stud 21, sand slide guide 20 having guide planes 17 and 18 perpendicular to each other to contact with the corner of object 11 and letting cutting blades 12 of rotating cutter 3 be slanted at 45° and projected into angle or space 19 formed between guide planes 17 and 18. Stud 21 comprises screw 21A screwed into and fixed to the bottom of slide guide 20, barrel 21B and stopper head 21C which are made integral to one another and whose diameters becomes larger as it comes nearer the stopper head. Through-hole 22 shaped to loosely house barrel 21B and stopper head 21C therein is formed in the underside of slide guide 20 and length T of that portion of through-hole 22 whichhouses barrel 21B is made shorter than that of barrel 21B and when the top of slide guide 20 is closely contacted with the underside of guide base 13, clearance CL is formed between the top of stopper head 21C and the ceiling of that portion of through-hole 22 which houses stopper head 21C. Slide guide 20 is thus made swingable keeping screw 21A of stud 21 fully fixed to guide base 20.

Stud 21 round which slide guide 20 is swung is located at a position comparatively separated from the axial center of rotating cutter 3 and when slide guide 20 is swung round this pivot point, cutting blades 12 of rotating cutter 3 are projected into space 19 between guide planes 17 and 18 only by a distance proportional to the angle at which slide guide 20 is swung round the pivot point. This distance C denotes the amount of object 11 which is chamfered by cutting blades 12 of rotating cutter 3.

Figure 3:
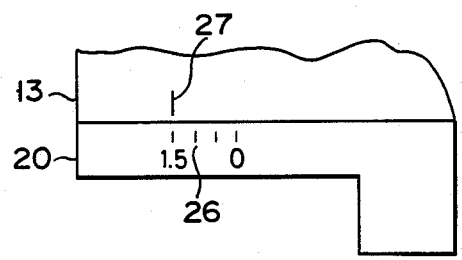
FIG. 3 is a side view showing a part of machine viewed from a line III—III in FIG. 1 in a direction shown by arrows.

Slot 24 formed along a circle which is drawn round stud 21 is positioned opposite to stud 21 at guide base 13, sandwiching the axial center of rotating cutter 3 between stud 21 and slot 24. Stopper screw 25 is screwed into slide guide 20 after being passed through slot 24. Slide guide 20 is allowed to swing relative to giode base 13 only at an angle of θ which is defined by the length of arched slot 24. As shown in FIG. 3, for example, the amount C of projection of cutting blades 12 is set 1.5 mm when the left end of slot 24 is struck against stopper screw 25, while it becomes 0 mm when the right end of slot 24 is struck against stopper screw 25. Graduations 26 for representing chamfered amounts of objects to be processed are engraved on a side of slide guide 20 and reference line 27 is also engraved on a side of guide base 13 on slide guide 20. Slide guide 20 has a hole 28 for receiving cutting blades 12 and when it is swung relative to guide base 13 within the angle of θ, cutting blades 12 can be left not contacted with it.

Figure 5:
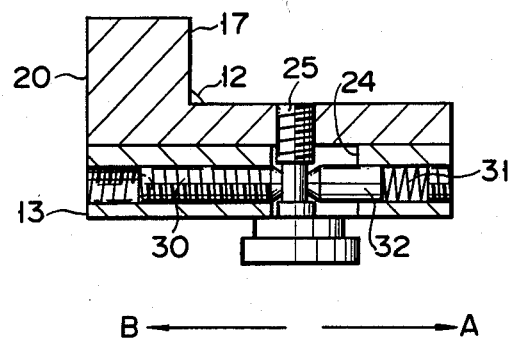
FIG. 5 is a sectional view taken along a line V—V in FIG. 4.

The front end of adjusting screw 30 which is screwed into slide guide 20 to freely slide into and out of slot 24 is projected from one end or that inner wall of slot 24 which is on the side of one guide plane 17 vertical in FIGS. 2, 3 and 5, while the front end of push piece 32 urged by compression coil spring 31 is projected from the other end of slot 24.

Figure 4:
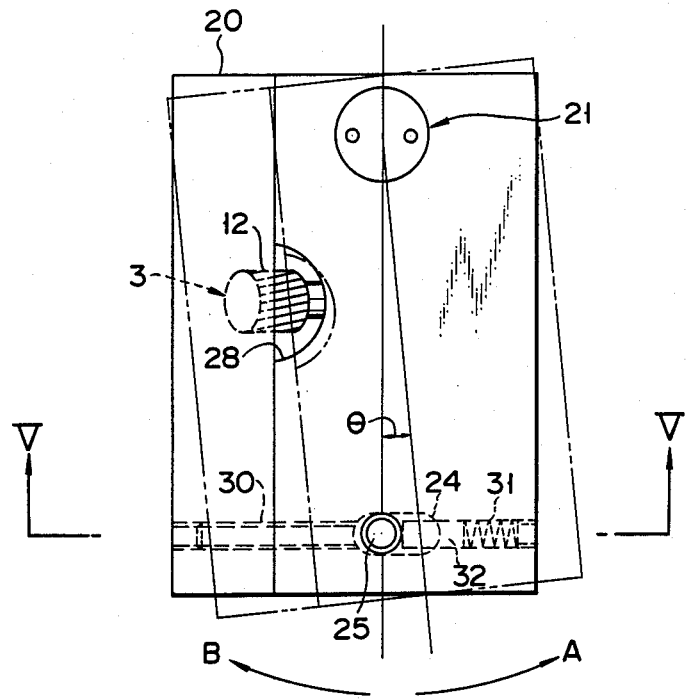
FIG. 4 is a view showing a part of the machine bottom viewed from a line IV—IV in FIG. 2 in a direction shown by arrows.

Upon adjusting the chamfered amount of an object, adjusting screw 30 serves to move stopper screw 25 in slot 24 in direction A in FIGS. 4 and 5 in response to the pitch of threads of screw 30 and the number of rotations thereof. It also serves as a stopper for preventing stopper screw 25 from mistakenly returning to its original position.

Push piece 32 is struck against stopper screw 25 to urge the latter toward adjusting screw 30 and when adjusting screw 30 is returned in direction B in FIGS. 4 and 5, push piece 32 serves as a return means for causing stopper screw to follow the movement of adjusting screw 30. When slide guide 20 is swung relative to guide base 13 to adjust the chamfered amount of an object, stopper screw 25 can follow the movement of adjusting screw 30 and contact with the front end thereof in whichever direction of right and left adjusting screw 30 may be turned. When adjusting screw 30 is only turned in a desired direction, slide guide 20 can be swung to a desired position relative to guide base 13 to adjust the chamfered amount of an object to be processed.

The chamfered amount of an object which can be set by swinging slide guide 20 relative to guide base 13 in the angle range of $\theta$ can be held as it is when stopper screw 25 is further screwed into slide guide 20.

Stopper screw 25 is loosened to make slide guide 20 swingable round stud 21 in relation to guide base 13. Adjusting screw 30 is turned by predetermined times in desired right or left direction to move its front end in slot 24 in direction A or B. When adjusting screw 30 is turned in clockwise direction to move its front end in slot 24 in direction A, for example, stopper screw 25 is pushed and moved in direction A by the front end of adjusting screw 30 and push piece 32 is thus retreated against compression coil spring 31. As the result, slide guide 20 integral to stopper screw 30 is swung in direction A by an angle which is proportional to the distance of adjusting screw 30 moved in direction A. When adjusting screw 30 is turned in counter-clockwise direction to move its front end in slit 24 in direction B, stopper screw 25 which is urged in direction B by push piece 32 follows the retreat of adjusting screw 30, contacting the front end of screw 30, and slide guide 20 is swung in direction B by an angle which is proportional to the distance of adjusting screw 30 retreated in direction B. The axial length of that portion of through-hole 22 in slide guide 20 which houses barrel 21B of stud 21 is made a little shorter than that of barrel 21B and this makes it quite unnecessary to loosen stud 21 upon adjusting the chamfered amount of an object.

The relation between the angle of slide guide 20 swung relative to guide base 13 and the chamfered amount of an object is usually determined by graduations 26 and when the chamfered amount of an object is to be set by graduations 26, adjusting screw 30 is turned to align that one of graduations 26, which represents desirable chamfered amount C of the object, with reference line 27. When chamfered amount C of an object cannot be represented by any of graduations 26, that is, it has an odd shape, adjustment can be similarly achieved by fixing the relative position between reference line 27 and that one of graduations 26 which represents a value closest to this chamfered amount C of the object. However, the moving distance of adjusting screw 30 or angle of slide guide 20 swung relative to guide base 13 is determined by the relation between the number of turns of adjusting screw 30 and the pitch of threads thereof. When it is previously set what distance adjusting screw 30 moves per one turn thereof, therefore, the chamfered amount of the object in which the odd is included can be easily and accurately fixed by the number of turns of adjusting screw 30.

When the chamfered amount of an object which has been set is to be increased or reduced, this micro-adjustment can be easily and accurately achieved by turning adjusting screw 30. When the chamfered amount of an object is set by turning adjusting screw 30, stopper screw 25 is further screwed into slide guide 20 to fix the latter to base guide 13. Stopper screw 25 which is urged by push piece 32 is contracted with the front end of adjusting screw 30, following the movement of screw 30. When stopper screw 25 is to be further screwed into slide guide 20, therefore, it is not needed that slide guide 20 is pushed in direction B to find whether or not adjusting screw 30 is contacted with stopper screw 25.

After the chamfered amount of an object is set in this manner, slide guide 20 is mounted on and moved along the corner of object 11, driving rotating cutter 3. Cutting blades 12 of rotating cutter 3 are projected into space 19 between planes 17 and 18 of slide guide 20 by a predetermined distance to chamfer the corner of object 11. Force acting in direction B in FIG. 5 is added to guide base 13 through handle section 2 during the chamfering process. However, adjusting screw 30 is directed to strike against stopper screw 25 or project into slit 24 from that end of slit 24 which is on the side of plane 17. Even when stopper screw 25 becomes loose during the chamfering process or it is not sufficiently screwed into slide guide 20, therefore, the chamfered amount of an object which has been set is not mistakenly changed during the chamfering process.

It should be understood that the present invention is not limited to the above-described embodiment but that various changes and modifications can be made without departing the spirit and acope of the present invention.

Push piece 32, for example, which is urged by spring 31 is used by the above-described embodiment as the means for causing stopper screw 25 to follow the movement of adjusting screw 30, but it may not be used. In the case where it is not used, however, it is needed when adjusting screw 30 is retreated in direction B that slide guide 20 is pushed in direction B to strike the front end of adjusting screw 30 against stopper screw 25 before the further screwing of stopper screw 25 is started.

Slot 24 is formed in guide base 13 and stopper screw is screwed into slide guide 20 in the above-described embodiment, but it may be arranged that slot 24 is formed in slide guide 20 and stopper screw 25 is screwed into guide base 13. In this case, however, it is needed that the head of stopper screw 25 is embedded in plane 18.

What is claimed is:
1. A machine for chamfering the corner of an object comprising:
a body having a bottom surface portion;

a rotating cutter arranged in the body, said rotating cutter being projected from and slanted relative to the bottom surface portion;

a slide guide rotatably supported on said bottom surface portion and having guide planes which are perpendicular to each other and slidable along the corner of the object, a space being formed between said guide planes, into which space at least a portion of cutting blades of the rotating cutter projects;

a slot formed in said body;

a stopper screw which is screwed through said slot into said slide guide; and wherein adjustment means for moving a portion of the stopper screw are provided within said slot to thereby adjust the cutting blades projecting into the space.

2. The machine according to claim 1, wherein said adjusting means comprises an adjusting screw projected into the slot from one end in the longitudinal direction of the slot to push the portion of the stopper screw toward the other end of the slot, and a push piece and associated resilient means for urging the portion of the stopper screw toward the one end of the slot.

3. The machine according to claim 2, wherein the adjusting screw is located to oppose force reacting on the guide base while the rotating cutter is being used.

4. The machine according to claim 2, wherein the body includes a spindle housing having a male thread on its outer circumference and serving to detachably support the rotating cutter, a handle section and a guide base having screw holes which are concentric with each other and into which the spindle housing is screwed, and being connected integral to each other by the spindle housing and wherein the rotating cutter projected from the underside into the space can be adjusted by turning the spindle housing relative to the handle section and the guide base.

5. The machine according to claim 4, wherein the rotating cutter is projected from the underside, slanting relative to the underside at 45°.

6. The machine according to claim 5, further comprising a stud for connecting the guide base and the slide guide swingably to each other and including a screw, a barrel and a head whose diameters become larger in this order, wherein the guide base has a screw hole into which the screw of the stud is screwed, and the slide guide has a stepped through-hole concentric with screw hole and serving to house the barrel and the head of the stud and that portion of this through-hole which houses the barrel has a length a little shorter than the barrel in the axial direction of the through-hole.

7. The machine according to claim 6, wherein the stud pivotably connects the slide guide and the guide base at a position comparatively remove from the axial center of the rotating cutter, the slot is formed along a circle which is drawn round the stud, and the slide guide has a hole into which the rotating cutter is housed not to contact the slide guide while the stopper screw is moving in the slot.

8. The machine according to claim 7, wherein one of the guide base and the slide guide has graduations on one side thereof and the other has a reference line which enables the amount of their relative movement to be measured from these graduations.

* * * * *